(12) United States Patent
Mochizuki et al.

(10) Patent No.: US 7,570,727 B2
(45) Date of Patent: Aug. 4, 2009

(54) DATA TRANSMISSION CONTROLLER AND SAMPLING FREQUENCY CONVERTER

(75) Inventors: Takayoshi Mochizuki, Hamamatsu (JP); Naotoshi Nishioka, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 598 days.

(21) Appl. No.: 11/355,638

(22) Filed: Feb. 15, 2006

(65) Prior Publication Data

US 2006/0188052 A1 Aug. 24, 2006

(30) Foreign Application Priority Data

Feb. 24, 2005 (JP) ............................. 2005-049510
Mar. 25, 2005 (JP) ............................. 2005-090225

(51) Int. Cl.
*H04L 7/00* (2006.01)
*H04L 25/00* (2006.01)
*H04L 25/40* (2006.01)

(52) U.S. Cl. ...................... 375/372; 375/371; 375/373; 375/376; 710/53; 710/52; 710/60; 710/61

(58) Field of Classification Search ................ 375/372, 375/371, 373, 376; 710/52, 53, 58, 60, 61
See application file for complete search history.

(56) References Cited

U.S. PATENT DOCUMENTS 6,263,036 B1 * 7/2001 Yamamoto et al. .......... 375/372
7,450,678 B2 * 11/2008 Nishioka .................... 375/372

FOREIGN PATENT DOCUMENTS

JP 11-055075 2/1999

* cited by examiner

*Primary Examiner*—Phuong Phu
(74) *Attorney, Agent, or Firm*—Morrison & Foerster LLP

(57) ABSTRACT

In a data transmission controller apparatus, a first-in first-out storage stores newly inputted data in response to a write request signal, and reads and outputs the stored data which has been stored earliest in response to a read request signal. A remaining data amount detection portion detects a remaining data amount of the stored data which remain in the first-in first-out storage. A variable frequency oscillating portion generates an enable signal at a time rate according to frequency control information so as to enable generation of the write request signal or read request signal. A frequency control portion corrects the frequency control information so as to return the remaining data amount to an appropriate value when the remaining data amount detected by the remaining data amount detection portion varies away from the appropriate value toward an upper limit value or varies away from the appropriate value toward a lower limit value.

6 Claims, 10 Drawing Sheets

| ΔS | Valid_ptr | ΔT |
|---|---|---|
| — | 7 (UPPER LIMIT) | +3 |
| INCREASING | 6 | +2 |
| | 5 | +1 |
| — | 4 | 0 |
| DECREASING | 3 | −1 |
| | 2 | −2 |
| | 1 | −3 |
| — | 0 (LOWER LIMIT) | −3 |
| OTHER THAN THE ABOVE | | 0 |

FIG.11

| UP/DOWN | EFFECTIVE DATA COUNT | ΔT |
|---|---|---|
| DECREASING | 0 | 16 |
| | 1 | 16 |
| | 2 | 16 |
| | 3 | 16 |
| | 4 | 8 |
| | 5 | 4 |
| | 6 | 4 |
| | 7 | 1 |
| OTHERS | — | 0 |
| INCREASING | 9 | −1 |
| | 10 | −4 |
| | 11 | −4 |
| | 12 | −8 |
| | 13 | −16 |
| | 14 | −16 |
| | 15 | −16 |

DATA TRANSMISSION CONTROLLER AND SAMPLING FREQUENCY CONVERTER

BACKGROUND OF THE INVENTION

1. Technical Field

The present invention relates to a data transmission controller having a jitter reduction function and a sampling frequency converter using the data transmission controller. Specifically, the present invention relates to a sampling frequency converter appropriate for digital audio devices and the like.

2. Related Art

In the field of digital audio and the like, audio data is often interchanged between two devices that operate synchronously with each other, but based on respective independent clocks. In this case, a preceding device outputs data synchronously with the device's own clock. A subsequent device inputs data synchronously with the device's own clock. Generally, clocks of both devices contain jitters. To reduce jitters, a FIFO (First-In First-Out buffer) is inserted between both devices. Data is often transmitted via the FIFO. In addition to using the FIFO, PLL (Phase Locked Loop) control may be provided. The PLL control monitors the amount of data remaining in the FIFO such that a clock jitter may not cause the FIFO to overflow or underflow. When the amount of remaining data becomes greater than a appropriate value, the PLL control increases a data output speed in the FIFO, for example. When the amount of remaining data becomes smaller than a appropriate value, the PLL control decreases the data output speed in the FIFO, for example. In the field of digital audio and the like, there are provided devices that comply with various sampling frequencies. Devices with different sampling frequencies may be often connected to each other. In such case, a sampling frequency converter is used to adjust the sampling frequency of sample data output from a preceding device to the sampling frequency for a subsequent device. Japanese Patent Application Laid-Open Publication No. 11-55075 discloses the technology of applying the above-mentioned FIFO and PLL control to the sampling frequency converter.

The above-mentioned conventional technology increases or decreases the data output speed or the data input speed in the FIFO in accordance with a difference between the amount of data remaining in the FIFO and the appropriate value. When the speed is excessively increased or decreased in accordance with the difference, the amount of remaining data may vary with the time and data transmission operations may become unstable. That is, there is a time lag between adjusting a data output speed or the like and a resulting increase or decrease in the amount of remaining data. During the time lag, the data output speed or the like is still adjusted. When the amount of remaining data becomes stable, a variation in the amount of remaining data somewhat increases.

Digital audio devices and the like use various sampling frequencies such as 32 kHz, 44.1 kHz, and 48 kHz. There may be a case of connecting devices having different sampling frequencies to each other. When a receiving-side device operates at a fixed speed for reading data strings of an original signal waveform transmitted from a transmission-side device, an output signal waveform is distorted along the time axis. The original signal waveform is not correctly reproduced. To solve this problem, the transmission-side device may use a sampling frequency converter. This type of sampling frequency converter may have an interpolator. The sampling frequency converter accumulates a specified number of pieces of successively input past data. Each time the receiving-side device receives a data request signal having a given sampling frequency, the sampling frequency converter assumes that time point as an interpolating point. The sampling frequency converter generates data at this interpolating point by interpolating the accumulated data and supplies the generated data to the receiving-side device.

When data is supplied to the receiving-side device in the above-mentioned sampling frequency converter, the sampling point of that data corresponds to the timing to receive the data request signal. The data request signal needs to be so accurate as to contain no jitter. However, there is a limitation on removing jitters from the data request signal. A jitter inevitably occurs at the timing of the data request signal. An apparent jitter, when generated, disturbs equally spaced interval of data supplied from the sampling frequency converter to the receiving-side device. When the receiving-side device reproduces or records such data at a given time interval, the reproduced or recorded signal waveform is distorted from the original signal waveform represented by the data before conversion of the sampling frequency.

SUMMARY OF THE INVENTION

The present invention has been made in consideration of the foregoing. It is therefore a first object of the present invention to provide a transmission controller and a sampling frequency converter using the same capable of appropriately increasing or decreasing a data output speed or data input speed for promptly converging the amount of remaining data in FIFO to a appropriate value, and stably transmitting the data. It is therefore a second object of the present invention to provide a sampling frequency converter capable of outputting data having a requested sampling frequency without distorting a waveform even when a jitter is contained in a data request signal supplied from a receiving-side device.

In a first aspect of the present invention, there is provided a transmission controller apparatus comprising: a first-in first-out storage portion that stores newly inputted data in response to a write request signal and that reads and outputs the stored data which has been stored earliest in response to a read request signal; a remaining data amount detection portion that detects a remaining data amount of the stored data which remain in the first-in first-out storage portion; a variable frequency oscillating portion that generates an enable signal at a time rate according to frequency control information so as to enable generation of the write request signal or read request signal; and a frequency control portion that corrects the frequency control information so as to return the remaining data amount to an appropriate value when the remaining data amount detected by the remaining data amount detection portion varies away from the appropriate value toward an upper limit value or varies away from the appropriate value toward a lower limit value, or when the remaining data amount reaches the upper limit value or the lower limit value. Preferably, the frequency control portion corrects the frequency control information when the remaining data amount starts to vary away from the appropriate value toward the upper limit value or starts to vary away from the appropriate value toward the lower limit value.

There is also provided a sampling frequency converter apparatus comprising: an interpolation part that interpolates data according to an interpolation ratio; and a transmission control part that transmits the interpolated data based on frequency control information, wherein the interpolation part comprises: a holding portion that successively receives data having a first sampling frequency and holds the received data as an interpolation input string of the data; and an interpolating portion that generates the interpolated data having a second sampling frequency by performing interpolation using an interpolation coefficient corresponding to the interpolation ratio generated by the transmission control part and using the interpolation input string of the data held in the holding portion, and wherein the transmission control part comprises: a first-in first-out storage portion that is responsive to a write request signal for storing the interpolated data being outputted from the interpolation part and having the second sampling frequency, and that reads and outputs the stored data which has been stored earliest in response to a read request signal; a remaining data amount detection portion that detects a remaining data amount of the data stored in the first-in first-out storage portion; a variable frequency oscillating portion that generates an enable signal at a time rate according to the frequency control information so as to enable generation of the write request signal, and that generates the interpolation ratio varying at a speed according to the frequency control information; and a frequency control portion that corrects the frequency control information so as to return the remaining data amount to an appropriate value when the remaining data amount detected by the remaining data amount detection portion varies away from the appropriate value toward an upper limit value or varies away from the appropriate value toward a lower limit value, or when the remaining data amount reaches the upper limit value or the lower limit value.

There is further provided a sampling frequency converter apparatus comprising: an interpolation part that interpolates data according to an interpolation ratio; and a transmission control part that transmits the data to the interpolation part based on frequency control information, wherein the interpolation part comprises: a holding portion that successively receives the data having a first sampling frequency from the transmission control part and holds the received data as an interpolation input string of the data; and an interpolating portion that generates interpolated data having a second sampling frequency by performing interpolation using an interpolation coefficient corresponding to the interpolation ratio generated by the transmission control part and using the interpolation input string of the data held in the holding portion, and wherein the transmission control part comprises: a first-in first-out storage portion that is responsive to a write request signal for storing data being inputted from an preceding device and having the first sampling frequency, and that reads and outputs the stored data which has been stored earliest to the interpolation part in response to a read request signal; a remaining data amount detection portion that detects a remaining data amount of the data stored in the first-in first-out storage portion; a variable frequency oscillating portion that generates an enable signal at a time rate according to the frequency control information so as to enable generation of the read request signal, and that generates the interpolation ratio varying at a speed according to the frequency control information; and a frequency control portion that corrects the frequency control information so as to return the remaining data amount to an appropriate value when the remaining data amount detected by the remaining data amount detection portion varies away from the appropriate value toward an upper limit value or varies away from the appropriate value toward a lower limit value, or when the remaining data amount reaches the upper limit value or the lower limit value.

There is still further provided a sampling frequency converter apparatus comprising: an interpolation part that interpolates data according to an interpolation coefficient; and a transmission control part that transmits the interpolated data based on frequency control information, wherein the interpolation part comprises: a holding portion that successively receives data having a first sampling frequency and holds the received data as an interpolation input string of the data; and an interpolating portion that generates the interpolated data having a second sampling frequency by performing interpolation using the interpolation coefficient generated by the transmission control part and using the interpolation input string of the data held in the holding portion, and wherein the transmission control part comprises: a first-in first-out storage portion that is responsive to a write request signal for storing the interpolated data being outputted from the interpolation part and having the second sampling frequency, and that reads and outputs the stored data which has been stored earliest in response to a read request signal; a remaining data amount detection portion that detects a remaining data amount of the data stored in the first-in first-out storage potion; a frequency control information generating portion that generates the frequency control information effective to control the remaining data amount to return to an appropriate value; a write request signal generating portion that generates the write request signal at a timing obtained by accumulating the frequency control information; and an interpolation coefficient generating portion that generates the interpolation coefficient at the timing when the write request signal is generated. Preferably, the write request signal generating portion generates the write request signal which synchronizes with a main clock and which has the same time rate as an average time rate of the read request signal.

According to the first aspect of the invention, the inventive apparatus only corrects the minimum necessary frequency control information for returning the remaining data amount to an appropriate value. Accordingly, it is possible to prevent the remaining data amount from fluctuating and to fast align the remaining data amount to an appropriate value. Therefore, stable data transmission can be realized. The use of such transmission controller for a sampling frequency converter can implement high-quality sampling frequency conversion hardly subject to waveform distortion.

In a second aspect of the invention, there is provided a sampling frequency converter apparatus comprising: a first data storage portion that stores a specified number of data which are sequentially inputted; a second data storage portion that stores newly inputted data in response to a write request signal and that sequentially reads the data which has been stored earliest in response to a read request signal; a write speed adjusting portion that generates the write request signal which synchronizes with a main clock and which has the same time rate as an average time rate of the read request signal; an interpolation coefficient generation portion that calculates an interpolation coefficient in correspondence to a timing of generating the write request signal; and an interpolating portion that performs interpolation using the interpolation coefficient calculated by the interpolation coefficient generation portion at the timing of generating the write request signal and using the data stored in the first data storage portion and that supplies the data resulting from the interpolation to the second data storage portion.

Preferably, the write speed adjusting portion comprises: an effective data count detection portion that detects an effective data count indicating a number of the stored data which remain in the second data storage portion; a write request signal control portion that performs an operation synchronized with the main clock to generate phase information periodically varying at speeds corresponding to the frequency control information, and that generates the write request signal synchronized with a period of the phase information; and a frequency control portion that controls the frequency control information so as to converge the effective data count to an appropriate value, wherein the interpolation coefficient generation portion calculates the interpolation coefficient from the phase information at a timing of generating the write request signal.

Preferably, the inventive sampling frequency converter apparatus further comprises an N-times upsampler that multiplies a sampling frequency of input data by a factor of N (N is an integer greater than or equal to 2) and supplies the input data having the multiplied sampling frequency to the first data storage portion, wherein the interpolating portion performs linear interpolation of the input data stored in the first data storage portion.

According to the second aspect of the present invention, the write request signal is generated in synchronization with the main clock. The interpolation coefficient corresponding to the timing of generating this write request signal is used to interpolate data to be stored in the second data storage. Even when a jitter occurs at the timing of generating the read request signal, data to be stored in the second data storage is free from an effect of the jitter.

BRIEF DESCRIPTION OF THE DRAWINGS

FIG. 11 is a diagram showing the contents of a ΔT table according to the embodiment.

DETAILED DESCRIPTION OF THE INVENTION

Embodiments of the present invention will be described in further detail with reference to the accompanying drawings.

First Embodiment

Figure 1:
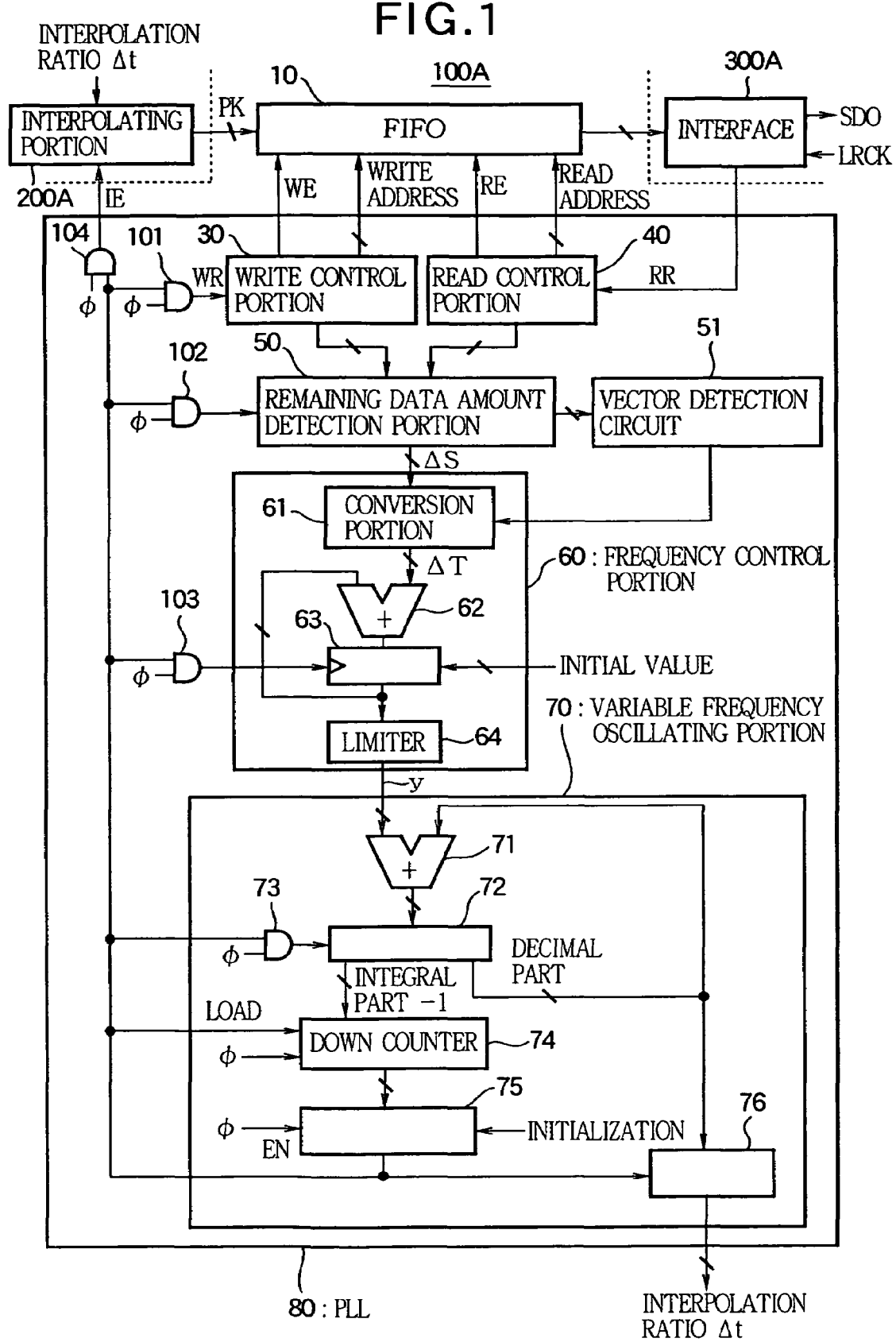
FIG. 1 IS a block diagram showing a first embodiment of the sampling frequency converter according to the first aspect of the present invention.
Figure 2:
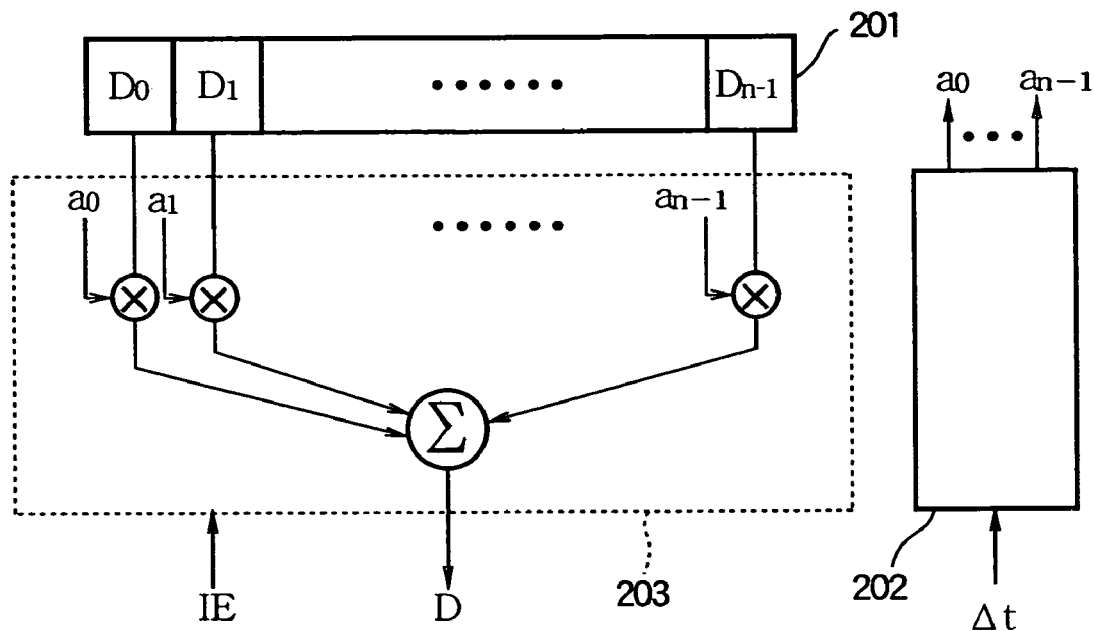
FIG. 2 is a block diagram exemplifying the configuration of the interpolating portion according to the first embodiment.

FIG. 1 is a block diagram showing the first embodiment of the sampling frequency converter according to the first aspect of the present invention. The sampling frequency converter is basically composed of a transmission controller 10A, an interpolating portion 200A, and an interface 300A As shown in FIG. 2, the interpolating portion 200A has an n-stage shift register 201, an interpolation coefficient generating portion 202, and a convoluting portion 203. The shift register 201 sequentially accepts data of a first sampling frequency from a preceding device before the interpolating portion 200A. The shift register 201 holds n pieces of the accepted data as an interpolation input data string.

Figure 3:
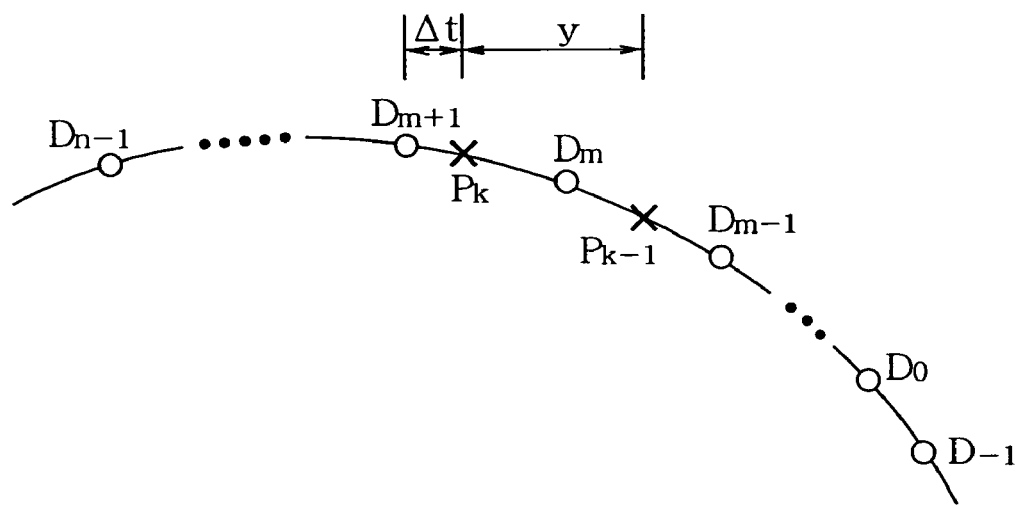
FIG. 3 is a waveform chart showing operations of the interpolating portion.

The interpolation coefficient generating portion 202 is supplied with interpolation ratio Δt from the transmission controller 100A. The interpolation ratio Δt indicates the phase of a sampling point for data to be generated in the interpolating portion 200A. In more detail, as shown in FIG. 3, the interpolating portion 200A according to the embodiment uses the interpolation to find data $P_k$ between data $D_{m+1}$ and data $D_m$ in the interpolation input data string $D_0$ through $D_{n-1}$ held in the shift register 201. Interpolation ratio Δt indicates the sampling point for data $P_k$ to be interpolated between the sampling point for data $D_{m+1}$ and the sampling point for data $D_m$ on the time axis. The interpolation coefficient generating portion 202 is ROM that stores different sets of interpolation coefficient values corresponding to various types of interpolation ratio Δt, for example. The interpolation coefficient generating portion 202 outputs a set of interpolation coefficient values $a_0$ through $a_{n-1}$ corresponding to the interpolation ratio Δt supplied from the transmission controller 100A.

The convoluting portion 203 is supplied with data input enable signal IE synchronized with a main clock φ from the transmission controller 100A. In response to this, the convoluting portion 203 convolutes the interpolation input data string $D_0$ through $D_n$_held in the shift register 201 with the interpolation coefficient string $a_0$ through $a_n$_output from the interpolation coefficient generating portion 202 to output data $P_k$ having a second sampling frequency. Main clock φ has the same frequency as the first sampling frequency. The transmission controller 100A supplies the interpolating portion 200A with data input enable signal IE synchronized with main clock φ at the time rate equivalent to the second sampling frequency. The configuration for generating data input enable signal IE at such time rate will be described later.

The sampling point for data to be interpolated moves on the time axis at a speed corresponding to the second sampling frequency. Consequently, as shown in FIG. 3, the phase for data $P_{k-1}$ to be found next to data $P_k$ interpolated currently advances further than the phase for data $D_m$ stored in the shift register 201. In this case, data $P_k$ is interpolated, and then next data $P_{k-1}$ is interpolated. To do this, the shift register 201 incorporates new data $D_{-1}$ from a preceding device. The earliest data $D_n$_in the shift register 201 is discarded. An operation of incrementally advancing the phase for data to be interpolated is performed by repeatedly adding frequency control information y to the current interpolation ratio Δt. Frequency control information y is determined based on a ratio of the first sampling frequency to the second sampling frequency. The transmission controller 100A performs this operation. The detail will be described later.

The transmission controller 100A in FIG. 1 receives and saves a data string of the second sampling frequency from the above-mentioned interpolating portion 200A. The transmission controller 100A outputs this data string at a timing synchronized with a read request signal RR from the interface 300A. The interface 300A outputs read request signal RR to the transmission controller 100A in response to data request signal LRCK from an external device. The interface 300A outputs, as serial bit string SDO, data correspondingly output from the transmission controller 100A to a subsequent DSP.

The following describes the configuration of the transmission controller 100A.

A FIFO 10 is a First-In First-Out buffer composed of RAM (Random Access Memory), for example. The FIFO 10 according to the embodiment can store up to eight pieces of input data composed of a specified number of bits. The FIFO 10 sequentially saves data $P_k$ supplied from the interpolating portion 200A and sequentially outputs data $P_k$ first-in first-out basis from the earliest one first to the interface 300A. When main clock φ passes through an AND gate 101 and is supplied as a write request signal WR, a write control portion 30 generates a write address and write request signal WE and supplies them to FIFO 10. Based on write request signal WE, input data $P_k$ supplied to FIFO 10 is written to an area specified by the write address in the FIFO 10. In response to read request signal RR from the interface 300A, a read control portion 40 generates a read address and read request signal RE and supplies them to FIFO 10. The read address is controlled to specify the earliest one of unread input data remaining in FIFO 10. Input data specified by this read address is read from the FIFO 10 according to read request signal RE and is supplied to the interface 300A.

When main clock φ is supplied via the AND gate 102, a remaining data amount detection portion 50 detects a difference between the write address generated from the write control portion 30 and the read address generated from the read control portion. That is, this difference represents remaining data amount ΔS equivalent to the number of pieces of unread input data currently remaining in the FIFO 10. A vector detection circuit 51 detects a vector that represents a temporal variation of remaining data amount ΔS output from the remaining data amount detection portion 50.

The vector detection circuit 51 has three pointers Valid_0, Valid_1, and Valid_ptr. Pointer Valid_ptr stores currently remaining data amount ΔS. The value of pointer Valid_ptr, when differing from that of pointer Valid_0, is assigned to pointer Valid_0. The value maintained so far in pointer Valid_0 is assigned to pointer Valid_1.

Generally, the relation of Valid_0>Valid_1 signifies that remaining data amount ΔS in the FIFO 10 is increasing. The relation of Valid_0<Valid_1 signifies that remaining data amount ΔS in the FIFO 10 is decreasing. However, there may be a case where remaining data amount ΔS varies from an increasing state to a decreasing state, or vice versa. Such variation cannot be determined only based on pointers Valid_0 and Valid_1. To solve this problem, the vector detection circuit 51 according to the embodiment references three pointers Valid_0, Valid_1, and Valid_ptr to detect a vector that indicates the mode of temporal variation in remaining data amount ΔS.

Remaining data amount ΔS output from the remaining data amount detection portion 50 indicates the amount of data remaining in the FIFO 10. At the same time, remaining data amount ΔS indicates a phase difference between the most recently written data $P_k$ and data $P_k$ most recently read by read request signal RR. The above-mentioned read control portion 40, the write control portion 30, the remaining data amount detection portion 50, the vector detection circuit 51, a frequency control portion 60, and a variable frequency oscillating portion 70 constitute a PLL 80 that converges the phase difference to an appropriate value.

The frequency control portion 60 is composed of a conversion portion 61, a full adder 62, a latch circuit 63, and a limiter 64. The conversion portion 61 has a table for converting remaining data amount ΔS into correction amount ΔT. The conversion portion 61 works based on this table and an instruction from the vector detection circuit 51 to convert the current remaining data amount ΔS output from the remaining data amount detection portion 51 into correction amount ΔT.

Figures 4, 5:
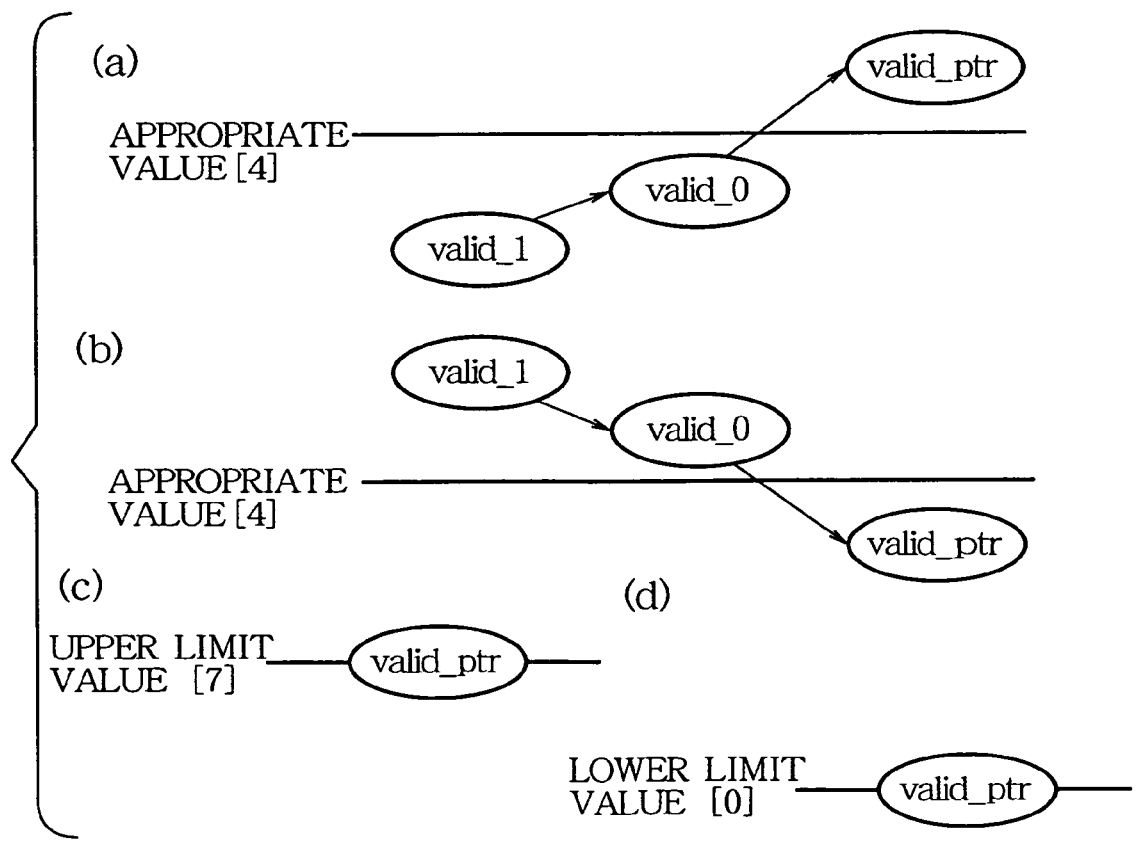
FIG. 4 is a diagram showing the method of generating the correction amount according to the first embodiment.
FIG. 5 is a diagram showing the case of generating a value other than "0" as the correction amount according to the first embodiment.

FIG. 4 shows the contents of the conversion performed by the vector detection circuit 51 and the conversion portion 61. FIGS. 5(a) through 5(d) show modes of variation in remaining data amount ΔS when the conversion portion 61 outputs correction amount ΔT other than "0".

As shown in FIG. 5(a), remaining data amount ΔS is increasing ((Valid_1<Valid_0<Valid_ptr). In addition, the value of pointer Valid_ptr indicates the current value of remaining data amount ΔS, and crosses and exceeds appropriate value "4" (Valid_ptr=5 and 6 according to the example in FIG. 4). In this case, the vector detection circuit 51 issues an instruction to the conversion portion 61 to output correction amount ΔT for increasing the frequency control information. As a result, the conversion portion 61 outputs positive correction amount ΔT having the magnitude equivalent to a difference between the current remaining data amount ΔS and appropriate value "4". FIG. 5(c) shows that the current remaining data amount ΔS reaches and stays at the upper limit "7". In this case, the conversion portion 61 outputs positive correction amount ΔT (ΔT=+3 in this example) having the magnitude equivalent to a difference between the current remaining data amount ΔS and appropriate value "4" regardless of the mode of variation in remaining data amount ΔS so far. Let us suppose that upper limit "7" is detected as remaining data amount ΔS to output positive correction amount ΔT=+3, and then upper limit "7" is detected again. In this case, remaining data amount ΔS may not be increasing. Only because remaining data amount ΔS equals upper limit "7", positive correction amount ΔT=+3 is output again.

On the other hand, as shown in FIG. 5(b), remaining data amount ΔS is decreasing (Valid_1>Valid_0>Valid_ptr). In addition, the value of pointer Valid_ptr indicates the current value of remaining data amount ΔS and falls below the appropriate value "4" (Valid_ptr=3 and 2 according to the example in FIG. 4). In this case, the vector detection circuit 51 issues an instruction to the conversion portion 61 to output correction amount ΔT for decreasing the frequency control information. As a result, the conversion portion 61 outputs negative correction amount ΔT having the magnitude equivalent to a difference between the current remaining data amount ΔS and appropriate value "4". FIG. 5(d) shows that the current remaining data amount ΔS reaches the lower limit "0". In this case, the conversion portion 61 outputs negative correction amount ΔT (ΔT=−3 in this example) regardless of the mode of variation in remaining data amount ΔS so far.

When remaining data amount ΔS indicates a behavior other than the above, the vector detection circuit 51 instructs the conversion portion 61 to maintain the current state of the frequency control information. In this case, the conversion portion 61 outputs "0" as correction amount ΔT. In short, the frequency control portion 60 corrects the frequency control information y so as to return the remaining data amount ΔS to an appropriate value when the remaining data amount ΔS detected by the remaining data amount detection portion 50 varies away from the appropriate value toward an upper limit value or varies away from the appropriate value toward a lower limit value, or when the remaining data amount ΔS reaches the upper limit value as shown in FIG. 5(c) or the lower limit value as shown in FIG. 5(d). More specifically, the frequency control portion 60 corrects the frequency control information y when the remaining data amount ΔS starts to vary away from the appropriate value toward the upper limit value as shown in FIG. 5(a) or starts to vary away from the appropriate value toward the lower limit value as shown in FIG. 5(b).

There has been described the detail of the processes performed by the remaining data amount detection portion 50, the vector detection circuit 51, and the conversion portion 61.

The full adder 62 and the latch circuit 63 provide means for correcting frequency control information y based on correction amount ΔT. The full adder 62 first performs an operation formulated by the following equation (1) based on the current frequency control information y held in the latch circuit 63 and correction amount ΔT supplied from the conversion portion 61. When main clock φ is supplied to the latch circuit 63 via the AND gate 103, the latch circuit 63 latches new frequency control information y as output data from the full adder 62. The limiter 64 limits frequency control information y to be smaller than or equal to a given upper limit. The limited frequency control information y is supplied to the variable frequency oscillating portion 70.

$$y \leftarrow y + \Delta T \quad (1)$$

The latch circuit 63 is configured to be initialized. When the sampling frequency converter starts operating, the latch circuit 63 is assigned with initial value y of the frequency control information, i.e., a value represented by the following equation.

$$y = \text{constant} \times (f1/f2) \quad (2)$$

where f1 denotes the first sampling frequency before the sampling frequency conversion, and f2 denotes the second sampling frequency after the sampling frequency conversion.

The variable frequency oscillating portion 70 is composed of a full adder 71, a latch circuit 72, an AND gate 73, a down counter 74, an enable signal generation circuit 75, and a latch circuit 76. The full adder 71 adds frequency control information y output from the frequency control portion 60 and interpolation ratio Δt, i.e., a decimal part of output data from the latch circuit 72, and outputs a result. Adding frequency control information y and interpolation ratio Δt performs the "operation of incrementally advancing the phase for data to be interpolated" as mentioned above. When supplied with main clock φ via the AND gate 73, the latch circuit 72 latches output data from the full adder 71 and outputs a result. The down counter 74 is supplied with preset data, i.e., a value resulting from subtracting "1" from the integral part of the output data from the latch circuit 72. When enable signal EN (to be described) is asserted, the down counter 74 synchronizes with main clock φ to incorporate the preset data as a count value. Thereafter, the down counter 74 counts down based on main clock φ. The enable signal generation circuit 75 is composed of a latch circuit, for example. When the count value of the down counter 74 becomes "0", the enable signal generation circuit 75 synchronizes with main clock φ to assert enable signal EN. The enable signal generation circuit 75 is initialized at the same time as the initialization of the latch circuit 63 as mentioned above. When initialized, the enable signal generation circuit 75 is configured to assert enable signal EN irrespectively of the count value of the down counter 74. When enable signal EN is asserted, the latch circuit 76 latches the decimal part of the output data from the latch circuit 72 and outputs it as interpolation ratio Δt to the interpolating portion 200A. When enable signal EN is asserted, the AND gate 101 outputs main clock φ as write request signal WR to the write control portion 30. The AND gate 104 outputs main clock φ as data input enable signal IE to the interpolating portion 200A. When enable signal EN is asserted, the AND gates 73, 102, and 103 supply main clock φ to the latch circuit 72, the remaining data amount detection portion 50, and the latch circuit 63. When main clock φ is supplied to the latch circuit 72 via the AND gate 73, there may be an increase of two or more in the integral part of data stored in the latch circuit 72. As mentioned above with reference to FIG. 3, this signifies that the phase of data to be found in the interpolating portion 200A currently does not advance further than the phase of data $D_m$ held in the shift register 201. In this case, the down counter 74 counts down several clocks. The interpolating portion 200A then accepts incorporates new data needed for the interpolation into the shift register 201 from a preceding device.

There has been described the detail of the configuration of the transmission controller 100A.

The following describes operations of the embodiment.

An initializing operation is performed when the sampling frequency converter starts operating. The initializing operation writes frequency control information's initial value y given by the above-mentioned equation (2) to the latch circuit 63 in the transmission controller 100A. Further during the initializing operation, the enable signal generation circuit 75 asserts enable signal EN. Accordingly, frequency control information y written to the latch circuit is then written to the latch circuit 72 via the limiter 64 and the full adder 71. The integral part of frequency control information y written to the latch circuit 72 is preset to the down counter 74. Thereafter, the down counter 74 counts down based on main clock φ. When the count value of the down counter 74 becomes "0", the enable signal generation circuit 75 asserts enable signal EN. As a result, main clock φ is supplied to the latch circuit 72 via the AND gate 73. Output data from the full adder 71 at that time is written to the latch circuit 72. This output data is a result of adding the frequency control information output from the frequency control portion 60 and the decimal part of the output data from the latch circuit 72. The integral part of the output data from the latch circuit 72 is preset to the down counter 74. The decimal part is written as interpolation ratio Δt to the latch circuit 76. As a result of repeating these operations, enable signal EN is generated at an average time density corresponding to the frequency control information. In addition, there is generated interpolation ratio Δt that varies at speeds corresponding to the frequency control information.

Main clock φ passes through the AND gates 101 and 104 each time enable signal EN is generated. Main clock φ is supplied as write request signal WR and data input enable signal IE to the write control portion 30 and the interpolating portion 200A. Further, main clock φ passes through the AND gates 102 and 103 each time enable signal EN is generated. Main clock φ is then supplied to the remaining data amount detection portion 50 and the latch circuit 63.

When supplied with data input enable signal IE, the interpolating portion 200A convolutes n pieces of already stored input data at the time with an interpolation coefficient string corresponding to interpolation ratio Δt. The result of this interpolation is output as data $P_k$ for the second sampling frequency.

When supplied with write request signal WR, the write control portion 30 increments the write address and supplies write request signal WR to the FIFO 10. As a result, the output data from the interpolating portion 200A is written to the area specified by the write address in the FIFO 10.

The interface 300A is supplied with clock LRCK from an external device and accordingly outputs read request signal RR. In accordance with this read request signal RR, the read control portion 40 supplies the FIFO 10 with the read address specifying the earliest data stored in the FIFO 10 together with read request signal RE to the FIFO 10. As a result, the earliest data is read from the FIFO 10 and is supplied to the interface 300A.

There may be a case where enable signal EN is asserted and main clock φ is supplied via the AND gate 102. In this case, the remaining data amount detection portion 50 finds remaining data amount ΔS in terms of a difference between the write address and the read address most recently supplied to the FIFO 10 at the time. The operation of finding remaining data amount ΔS is performed each time enable signal EN is asserted. Pointer Valid_ptr stores remaining data amount ΔS found by the remaining data amount detection portion 50. The value of pointer Valid_ptr, when differing from that of pointer Valid_0, is assigned to pointer Valid_0. The value maintained so far in pointer Valid_0 is assigned to pointer Valid_1.

Based on pointers Valid_ptr, Valid_0, and Vaild_1, the vector detection circuit 51 issues an instruction to the conversion portion to determine whether or not to increase or decrease the frequency control information or maintain the current value. According to this instruction, the conversion portion 61 converts remaining data amount ΔS (=Valid_ptr) supplied from the remaining data amount detection portion 50 into correction amount ΔT. As a result, correction amount ΔT is output as follows. Let us suppose that remaining data amount ΔS is increasing and the current value of remaining data amount ΔS exceeds appropriate value "4". In this case, positive correction amount ΔT is output so as to be equivalent to a difference between the current remaining data amount ΔS and appropriate value "4". When remaining data amount ΔS is set to upper limit "7", positive correction amount ΔT set to "3" is output. On the other hand, let us suppose that remaining data amount ΔS is decreasing and the current value of remaining data amount ΔS is smaller than appropriate value "4". In this case, negative correction amount ΔT is output so as to be equivalent to a difference between the current remaining data amount ΔS and appropriate value "4". When remaining data amount ΔS is set to lower limit "0", negative correction amount ΔT set to "−3" is output. In the other cases, correction amount ΔT set to "0" is output.

The full adder 62 adds correction amount ΔT output in this manner and the current frequency control information y stored in the latch circuit 63. The result is written as new frequency control information y to the latch circuit 63 according to main clock φ from the AND gate 103. Consequently, when positive correction amount ΔT is output, frequency control information y increases. When negative correction amount ΔT is output, frequency control information y decreases. When correction amount ΔT set to "0" is output, frequency control information y maintains the current value.

In this manner, the frequency control portion 60 increase or decreases frequency control information y based on correction amount ΔT. The variable frequency oscillating portion 70 outputs enable signal EN based on the adjusted frequency control information y. Increasing frequency control information y increases the average number of main clocks φ issued during an interval from the time of presetting the down counter 74 to the time of resetting the count value to "0". Thus, the average time rate of enable signal EN decreases. For this reason, the speed for writing data to the FIFO 10 decreases. By contrast, decreasing frequency control information y increases the average time rate of enable signal EN. The speed for writing data to the FIFO 10 increases.

When a data writing speed (i.e., the frequency or time rate of enable signal EN) is lower than a data reading speed (i.e., the frequency or time rate of read request signal RR) in the FIFO 10, remaining data amount ΔS decreases. When negative correction amount ΔT occurs during the decreasing process, frequency control information y decreases. The data writing speed increases. On the contrary, when the data writing speed is higher than the data reading speed in the FIFO 10, remaining data amount ΔS increases. When positive correction amount ΔT occurs during the decreasing process, frequency control information y increases. The data writing speed decreases. Since the PLL control is provided in accordance with an increase or decrease in remaining data amount ΔS, the writing speed follows the reading speed in the FIFO 10. Remaining data amount ΔS in the FIFO 10 is converged to appropriate value "4".

Figure 6:
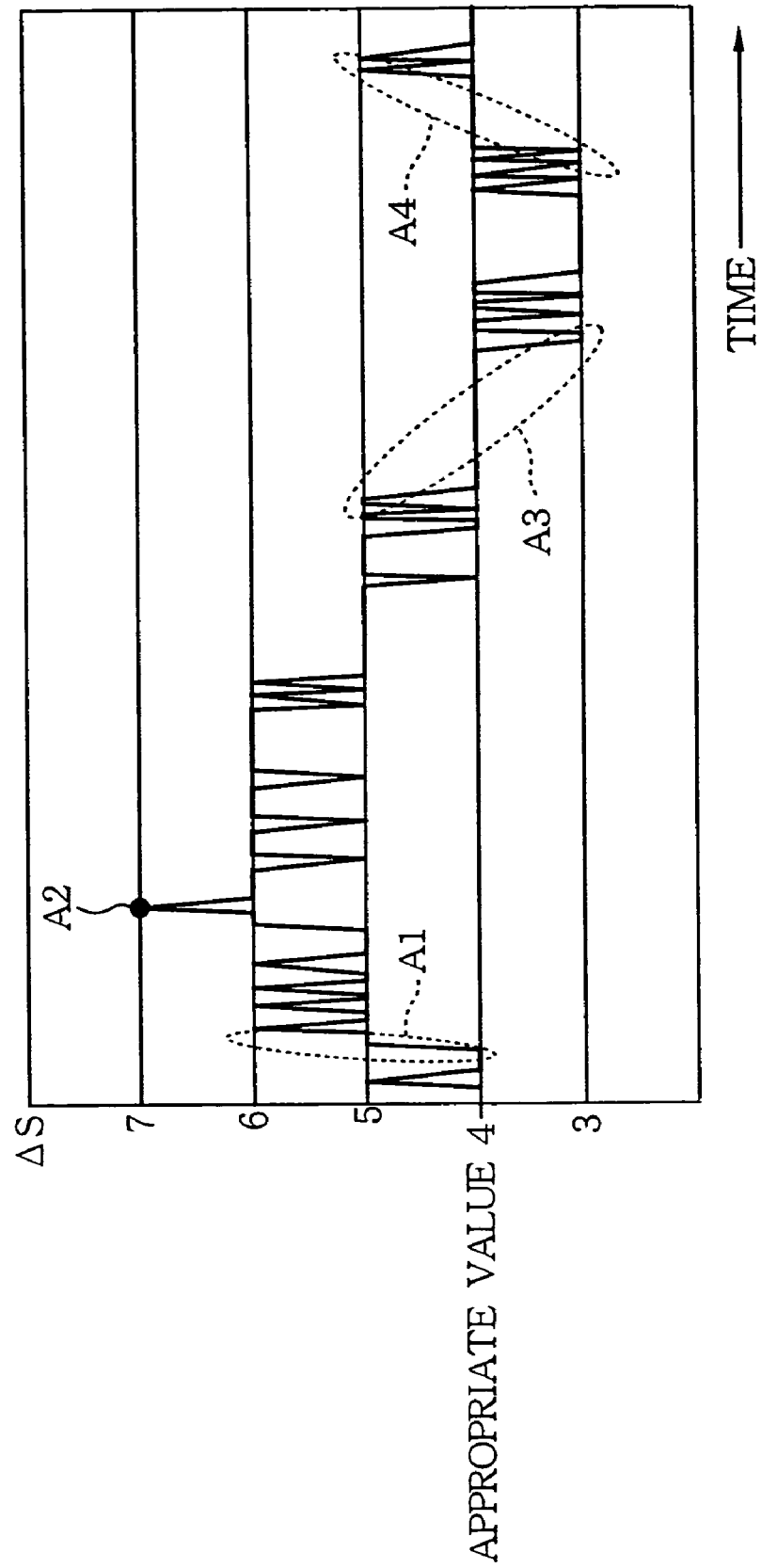
FIG. 6 is a time chart exemplifying a temporal change of the remaining data amount according to the first embodiment.

FIG. 6 is a time chart exemplifying a temporal variation of remaining data amount ΔS according to the embodiment. In FIG. 6, an interval indicated by reference symbol A1 satisfies such condition that remaining data amount ΔS gradually increases, the relation Valid_1<Valid_0<Valid_ptr takes effect at the point of ΔS="6", and Valid_ptr is larger than appropriate value "4". Therefore, at this point, there is generated positive correction amount ΔT=Valid_ptr—appropriate value=+2 to increase frequency control information y and decrease the data input speed in the FIFO 10. Subsequently, correction amount ΔT set to "0" is generated because the condition for generating positive or negative correction amount ΔT is not satisfied. At the point indicated by reference symbol A2, remaining data amount ΔS reaches upper limit "7". At this point, the condition for generating positive correction amount ΔT is satisfied. Accordingly, there is generated positive correction amount ΔT=Valid_ptr—appropriate value=+3 to decrease the data input speed in the FIFO 10.

According to the example in FIG. 6, positive correction amount ΔT occurs twice. Owing to this, remaining data amount ΔS scattered over appropriate value "4" returns to appropriate value "4". Subsequently, an interval indicated by reference symbol A3 satisfies such condition that remaining data amount ΔS decreases at the time gradient gentler than the interval indicated by reference symbol A1, the relation Valid_1>Valid_0>Valid_ptr takes effect at the point of ΔS="3", and Valid_ptr is smaller than appropriate value "4". Therefore, at this point, there is generated negative correction amount ΔT=Valid_ptr—appropriate value=−1 to decrease frequency control information y and increase the data input speed in the FIFO 10. An absolute value of correction amount ΔT generated at this time is smaller than that of correction amount ΔT generated at the timing indicated by the above-mentioned reference symbol A1 or A2. Accordingly, there occurs an intensity of behavior to return remaining data amount ΔS to appropriate value "4" (the intensity is hereafter referred to as return-to-appropriate-value strength for convenience's sake). This strength is weaker than the return-to-appropriate-value strength generated at the termination timing of the interval indicated by reference symbol A1 or the timing indicated by reference symbol A2. In the interval indicated by reference symbol A3, however, an amplitude of variation in remaining data amount ΔS is already sufficiently attenuated. The return-to-appropriate-value strength is expected to be as slight as this degree. The reason: when the variation of remaining data amount ΔS attenuates sufficiently, too large a return-to-appropriate-value strength rather scatters remaining data amount ΔS from appropriate value "4".

Subsequently to the interval indicated by reference symbol A3, remaining data amount ΔS repeats the oscillation within a range of appropriate value "4"±1. This is because of a shift between data input and output timings in the FIFO 10. Inputting one piece of data to the FIFO 10 causes ΔS to be appropriate value "4"+1. Outputting one piece of data from the FIFO 10 causes ΔS to be appropriate value "4"−1. In this state, the data input speed completely synchronizes with the data output speed in the FIFO 10. Remaining data amount ΔS in the FIFO 10 is stable.

Although not shown in FIG. 6, the frequency control information may contain an invalid initialization value because, for example, the frequency of read request signal RR supplied from the interface 300A deviates from the originally expected second sampling frequency f2. In such case, remaining data amount ΔS completely deviates from the appropriate value. The upper limit "7" or the lower limit "0" may be detected as remaining data amount ΔS successively more than once. In this case, positive correction amount ΔT=+3 (negative correction amount ΔT=−3) is generated each time the upper limit "7" (the lower limit "0") is detected as remaining data amount ΔS. In this manner, the frequency control information rapidly approaches a value appropriate to the frequency of read request signal RR. Subsequently, remaining data amount ΔS is converged to the appropriate value according to the operation as shown in FIG. 6.

As mentioned above, the embodiment generates positive or negative correction amount ΔT so as to return remaining data amount ΔS to the appropriate value when remaining data amount ΔS shows a behavior to deviate from the appropriate value and when remaining data amount ΔS completely deviates. Otherwise, value "0" is generated as correction amount ΔT. Correction amount ΔT to return remaining data amount ΔS to the appropriate value is generated only during a necessary interval. Remaining data amount ΔS can be promptly aligned to the appropriate value without generating a temporal variation in remaining data amount ΔS. Consequently, it is possible to implement high-quality data transmission that hardly causes waveform distortion.

Second Embodiment

Figure 7:
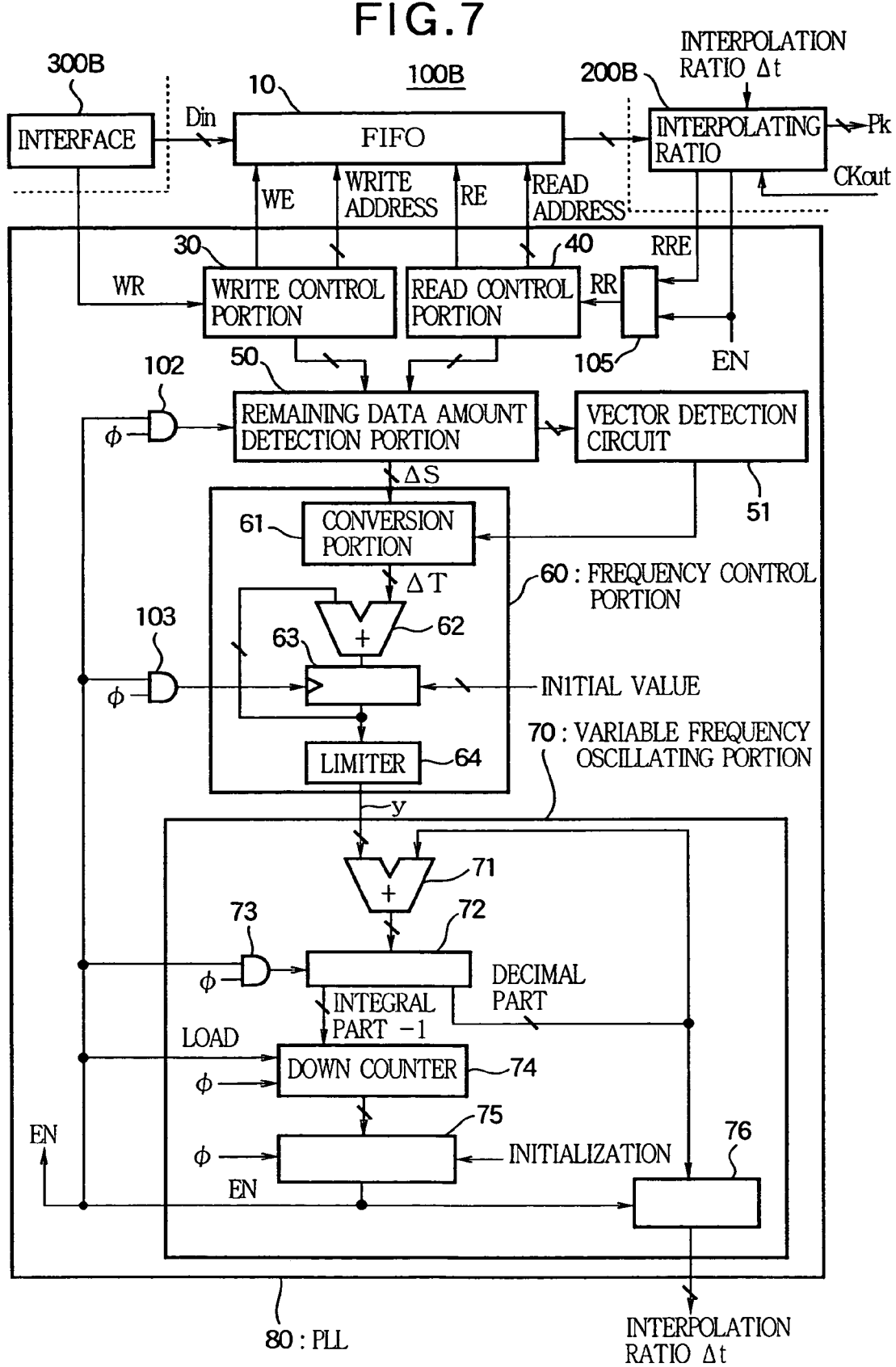
FIG. 7 is a block diagram showing a second embodiment of the sampling frequency converter according to the second aspect of the present invention.

FIG. 7 is a block diagram showing the second embodiment of the sampling frequency converter according to the first aspect of the present invention. According to the second embodiment, a transmission controller 100B is preceded by an interface 300B and is succeeded by an interpolating portion 200B. The interface 300B supplies the transmission controller 100B with not only write request signal WR, but also data Din having the first sampling frequency. The interpolating portion 200B is configured similarly to the interpolating portion 200A. The interpolating portion 200B uses a built-in shift register to hold a specified number of past data string fed from the FIFO 10. Similarly to the above-mentioned first embodiment, the interpolating portion 200B convolutes interpolating coefficient string corresponding to interpolation ratio Δt supplied from the latch circuit 76 with the data string. The interpolating portion 200B generates output data $P_k$ as a result of the convolution at the timing synchronized with output clock CKout having the second sampling frequency. The configuration of the transmission controller 100B differs from that of the transmission controller 100A as follows. The interface 300B directly supplies the write control portion 30 with write request signal WR having the same frequency as the first sampling frequency. Instead of the AND gates 101 and 104 in the first embodiment, there is provided a read request signal generation portion 105 to generate read request signal RR. Enable signal EN output from the enable signal generation circuit 75 is supplied to the read request signal generation portion 105 and the interpolating portion 200B. Enable signal EN supplied to the interpolating portion 200B works as a data output enable signal that enables interpolation and output of data having the second sampling frequency. The other considerations are the same as those in the above-mentioned first embodiment.

The transmission controller 100B synchronizes with main clock φ having the same frequency as the second sampling frequency and provides the PLL control to stabilize remaining data amount ΔS. During this control process, enable signal EN is asserted with the time density that synchronizes with main clock φ and corresponds to the first sampling frequency. When enable signal EN is asserted, the interpolating portion 200B outputs read request enable signal RRE at the timing synchronized with output clock CKout. When enable signal EN is asserted and then read request enable signal RRE is output, the read request signal generation portion 105 outputs read request signal RR to the read control portion 40. At this time, the read control portion 40 increments the read address by "1" and outputs read request signal RE. As a result, the earliest unread data in the FIFO 10 is read and is supplied to the interpolating portion 200B. The interpolating portion 200B writes the data supplied from the FIFO 10 to the first stage of the shift register. The existing data in the shift register is shifted to the succeeding stages to discard the data at the last stage. In accordance with the generation of output clock CKout, the interpolating portion 200B performs the interpolation using data strings held in the shift register and interpolation coefficient strings corresponding to interpolation ratio Δt. The interpolating portion 200B outputs data having the second sampling frequency as an interpolation result in synchronization with output clock CKout.

The above-mentioned first embodiment provides the PLL control to force the data input speed to follow the data output speed in the FIFO 10. The second embodiment provides the PLL control to force the data output speed to follow the data input speed in the FIFO 10. This PLL control is provided in the same manner as the first embodiment. Accordingly, the second embodiment also provides the same effects as those provided by the first embodiment.

With reference to the accompanying drawings, the following describes a sampling frequency converter in the second aspect of the present invention.

Figure 8:
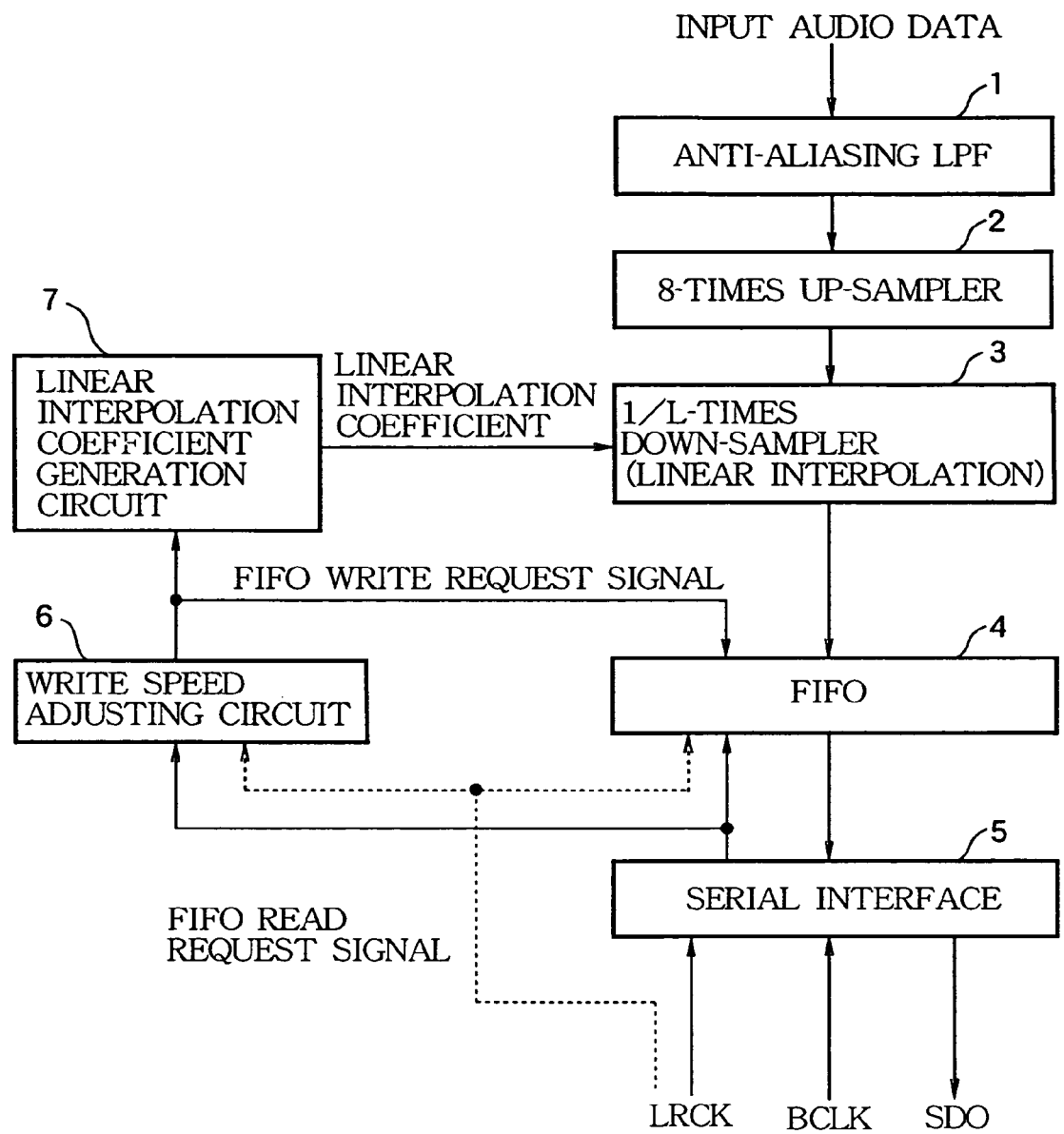
FIG. 8 is a block diagram showing an embodiment of the sampling frequency converter according to the second aspect of the present invention.

FIG. 8 is a block diagram showing the configuration of a sampling frequency converter according to the embodiment. In FIG. 8, an anti-aliasing LPF 1 is a circuit that provides input audio data with an LPF process to prevent a folding noise from occurring during sampling frequency conversion. The sampling frequency converter according to the embodiment receives input audio data having a first sampling frequency of 48 kHz. The sampling frequency converter selects a second sampling frequency from nine types of sampling frequencies between 8 through 48 kHz, and converts the received input audio data into audio data of the second sampling frequency for output. The anti-aliasing LPF 1 assumes a half of the selected second sampling frequency to be the cutoff frequency and removes components greater than or equal to the cutoff frequency from the input audio data.

An 8-times up-sampler 2 is a circuit that performs 8-times up-sampling for data having the first sampling frequency output from the anti-aliasing LPF 1, and outputs the data as audio data having the sampling frequency of 384 kHz. A 1/L down-sampler 3 is a circuit that uses linear interpolation to provide 1/L-times down-sampling for audio data with the 384 kHz sampling frequency output from the 8-times up-sampler 2 and outputs audio data having the second sampling frequency. The selected second sampling frequency determines a factor of down-sampling.

A FIFO (First In First Out) 4 is a first-in first-out buffer to store audio data having the second sampling frequency output from the 1/L down-sampler 3. In accordance with a FIFO read request signal, the FIFO 4 successively outputs stored audio data first-in first-out basis from the earliest first. A serial interface 5 is a circuit that provides control to supply a subsequent device with audio data having the second sampling frequency. The serial interface 5 is supplied with data request signal LRCK and bit clock BCLK from the subsequent device. Data request signal LRCK has the same frequency as the second sampling frequency. When supplied with data request signal LRCK, the serial interface 5 supplies a FIFO read request signal to the FIFO 4 and a write speed adjusting circuit 6. The serial interface 5 converts audio data accordingly output from the FIFO 4 into serial data SDO, and supplies serial data SDO to the subsequent device by synchronizing each bit of serial data SDO with bit clock BCLK.

The write speed adjusting circuit 6 generates a FIFO write request signal and outputs it to the FIFO 4 and a linear interpolation coefficient generation circuit 7. The FIFO write request signal has the same time rate or density as an average time rate or density generated by the FIFO read request signal, and is synchronized with 384 kHz main clock $\phi$. In more detail, the write speed adjusting circuit 6 generates phase information by accumulating frequency control information according to the second sampling frequency in synchronization with main clock $\phi$. The write speed adjusting circuit 6 generates the FIFO write request signal each time the phase information overflows. On the other hand, the write speed adjusting circuit 6 increases or decreases the frequency control information in accordance with an effective data count, i.e., the number of pieces of unread data in FIFO 4, and adjusts the time rate of the FIFO write request signal. In this manner, the FIFO write request signal is generated at the same time rate as that of the FIFO read request signal. Thus, the effective data count in the FIFO 4 converges to an appropriate value. The linear interpolation coefficient generation circuit 7 finds a linear interpolation coefficient from the phase information at the timing of generating the FIFO write request signal and supplies the linear interpolation coefficient to the 1/L down-sampler 3.

According to the embodiment, the phase information is sequentially updated by an operation synchronized with main clock $\phi$. A linear interpolation coefficient is generated based on the phase information at the timing of generating the FIFO write request signal. The FIFO write request signal is controlled so as to be generated at the same time rate as the FIFO read request signal, and is still generated at the timing synchronized with main clock $\phi$. Even when jitters occur at the timing of generating data request signal LRCK and the FIFO read request signal, the 1/L down-sampler 3 generates audio data having the second sampling frequency. The generated data is supplied to the subsequent device via the FIFO 4 and the serial interface 5.

There has been described the summary of the embodiment.

Figure 9:
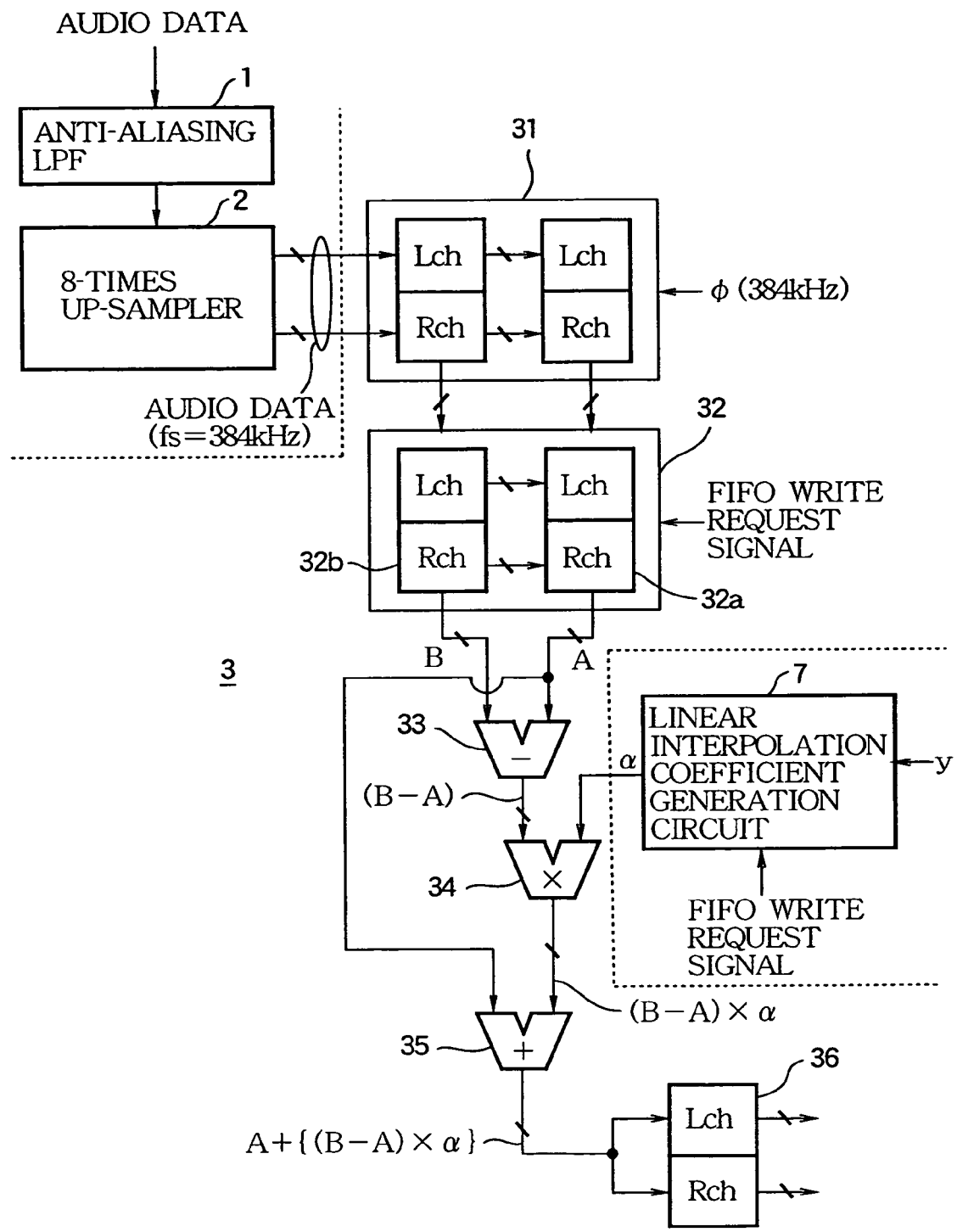
FIG. 9 is a block diagram showing the detailed configuration of a 1/L down-sampler according to the embodiment.
Figure 10:
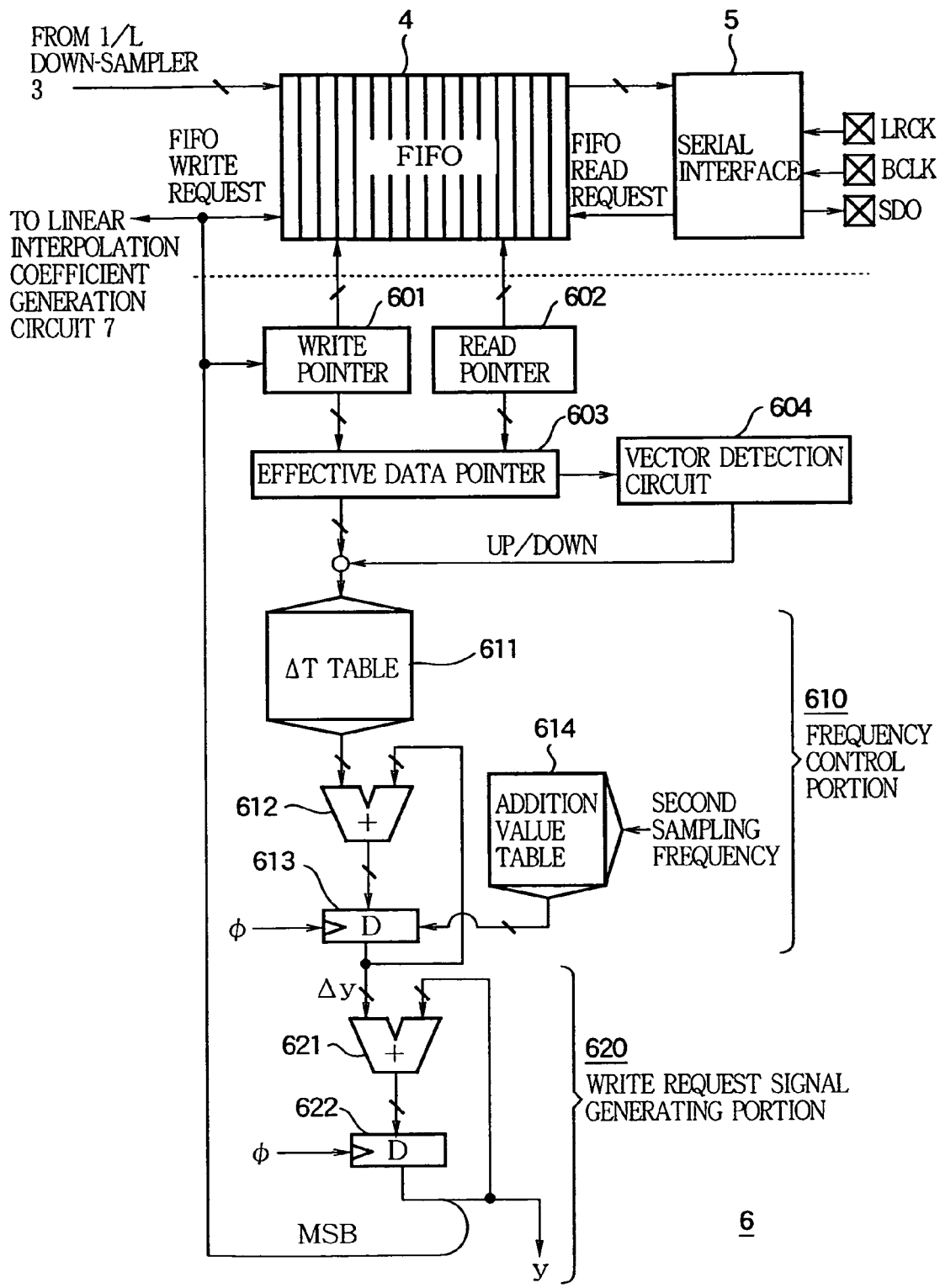
FIG. 10 is a block diagram showing the detailed configuration of a write speed adjusting circuit according to the embodiment.

FIG. 9 is a block diagram showing the detailed configuration of the 1/L down-sampler 3 in the sampling frequency converter that has been summarized. FIG. 10 is a block diagram showing the detailed configuration of the write speed adjusting circuit 6. With reference to these drawings, the following describes the detail of the sampling frequency converter according to the embodiment.

The 1/L down-sampler 3 will be first described. In FIG. 9, a temporary 2-stage FIFO 31 is composed of an L-channel 2-stage FIFO and an R-channel 2-stage FIFO. Each time 384 kHz main clock $\phi$ is supplied, the temporary 2-stage FIFO 31 incorporates L-channel and R-channel audio data output from the 8-times up-sampler 2 and holds two most recent pieces of audio data corresponding to the channels. An operation data storage portion 32 is composed of registers 32a and 32b for storing audio data at both ends sandwiching an interpolating point during the linear interpolation. When a FIFO write request signal is generated, the register 32a stores L-channel and R-channel audio data stored in the second stage of the temporary 2-stage FIFO 31. The register 32b stores audio L-channel and R-channel audio data stored in the first stage thereof. Audio data A and B stored in the registers 32a and 32b are used for the interpolation to find audio data having the second sampling frequency.

A subtractor 33, a multiplier 34, an adder 35, and a register 36 provide means for performing interpolation to find audio data having the second sampling frequency from the audio data A and B and for outputting a result. Under time sharing control, these circuits perform the interpolation to find audio data having the second sampling frequency for each of the L and R channels and supply the result to the FIFO 4 via the register 36 during an interval from the time of generating a FIFO write request signal and the time of generating the next write request signal.

In more detail, the subtractor 33 subtracts audio data A stored in the register 32a of the operation data storage portion 32 from L-channel audio data B stored in the register 32b thereof and outputs the resulting data B-A. The multiplier 34 multiplies data B-A by linear interpolation coefficient $\alpha$ just output from the linear interpolation coefficient generation circuit 7 to output data (B-A)×$\alpha$. The linear interpolation coefficient $\alpha$ is a numeric value indicating at which point between audio data A and B along the time axis the interpolation should be used to find the audio data having the second sampling frequency. The method of calculating the linear interpolation coefficient $\alpha$ will be described later. The adder 35 adds data (B-A)×$\alpha$ resulting from the multiplier 34 to L-channel audio data A stored in the register 32a of the operation data storage portion 32. The register 36 holds the addition result of A+(B-A)×$\alpha$ as L-channel audio data having the second sampling frequency. There have been described the processes of the subtractor 33, the multiplier 34, the adder 35, and the register 36 for the L channel. Similar processes are performed for R-channel audio data. The register 36 holds the result.

Referring now to FIG. 10, the write speed adjusting circuit 6 will be described. The FIFO 4 is a 16-stage FIFO that accumulates the thus generated audio data having the second sampling frequency. A write pointer 601 is a circuit that increments the write address by "1" and supplies it to the FIFO 4 each time a FIFO write request signal occurs. The write pointer 601 then writes the L-channel and R-channel audio data presently supplied from the register 36 to an area specified by the write address in the FIFO 4. A read pointer 602 is a circuit that increments the read address by "1" and supplies it to the FIFO 4 each time a FIFO read request signal occurs. The read pointer 602 then reads the L-channel and R-channel audio data from the area presently specified by the read address in the FIFO 4 and supplies the audio data to the serial interface 5.

An effective data pointer 603 is a circuit that subtracts the read address output from the read pointer 602 from the write address output from the write pointer 601 and outputs the effective data count as a subtraction result. The effective data count indicates the number of pieces of unread data in the audio data written to the FIFO 4.

A vector detection circuit 604 monitors the effective data count output from the effective data pointer 603 and outputs vector up/down information indicating which of the following modes applies to a temporal change in the effective data count. (a) The effective data count is increasing. (b) The effective data count is decreasing. (c) The increasing effective data count has changed to tend to decrease. (d) The decreasing effective data count has changed to tend to increase.

A frequency control portion 610 provides means for generating frequency control information $\Delta y$ that determines the frequency of a FIFO write request signal. A write request signal generating portion 620 is a circuit that accumulates frequency control information Δy each time main clock φ occurs. The write request signal generating portion 620 generates a FIFO write request signal each time phase information y, i.e., an accumulated value, overflows. The following describes configurations of these circuits in order.

The frequency control portion 610 is composed of a ΔT table 611, an adder 612, a latch 613, and an addition value table 614. The addition value table 614 stores initial values for frequency control information Δy corresponding to various second sampling frequencies. The write request signal generation portion 620 may repeatedly accumulate the frequency control information in synchronization with 384 kHz main clock φ. In this case, frequency control information Δy is configured to be a value so that phase information y as an accumulated value overflows at the time density equivalent to the second sampling frequency. In more detail, let us assume that phase information y takes a value ranging from 0 to M-1 and that the second sampling frequency is set to f2. Then, frequency control information Δy is initialized to be the following value.

$$\Delta y = M / (384 \, kHz / f2) = M / L \quad (3)$$

The latch 613 can be initialized. When the sampling frequency converter starts operating, frequency control information Δy is read from the addition value table 614. It should be noted that frequency control information Δy is associated with second sampling frequency f2 requested by a subsequent device. At this time, the latch 613 is initialized to frequency control information Δy. Each time 384 kHz main clock φ is generated afterwards, frequency control information Δy in the latch 613 is updated with output data from the adder 612.

There may be a case where the effective data count in the FIFO 4 may deviate from an appropriate value due to incorrect frequency control information Δy output from the latch. In such case, the ΔT table 611 and the adder 612 provide means for correcting frequency control information Δy to the appropriate value. The ΔT table 611 is used for converting a combination of the effective data count and the vector up/down into correction amount ΔT. FIG. 11 shows the contents of a conversion process performed by the ΔT table 611.

As shown in FIG. 11, the vector up/down may indicate that the effective data count is decreasing. When the effective data count is smaller than appropriate value "8", the ΔT table 611 outputs positive correction amount ΔT having an absolute value corresponding to a difference between the effective data count and appropriate value "8". The adder 612 adds positive correction amount ΔT to the current frequency control information Δ to increase frequency control information Δy. This increases the time density of the FIFO write request signal to suppress a decrease in the effective data count. Further, the vector up/down may indicate that the effective data count is increasing. When the effective data count is larger then appropriate value "8", the ΔT table 611 outputs negative correction amount ΔT having an absolute value corresponding to a difference between the effective data count and appropriate value "8". The adder 612 adds the negative correction amount ΔT to the current frequency control information Δy to decrease the frequency control information Δy as a result. This decreases the time density of the FIFO write request signal to suppress an increase in the effective data count.

Figure 12:
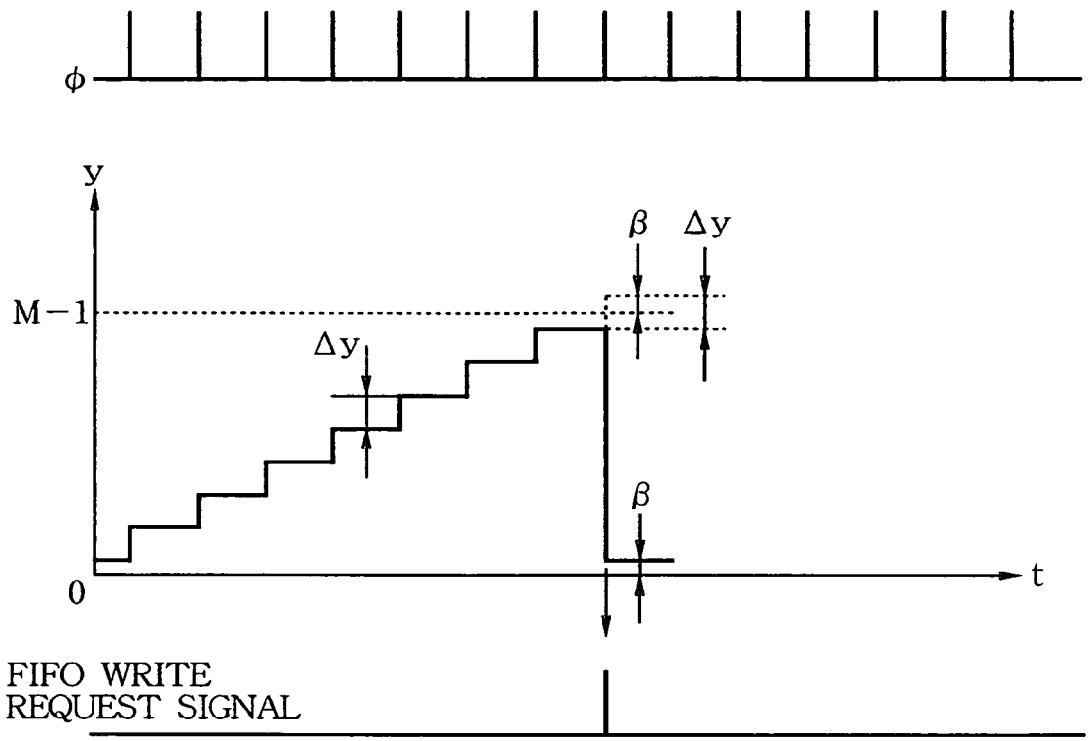
FIG. 12 is a time chart showing an operation of a write request signal generation portion according to the embodiment.

The write request signal generation portion 620 is composed of an adder 621 and a latch 622. The adder 621 adds frequency control information Δy supplied from the frequency control portion 610 to the current phase information y output from the latch 622. Each time main clock φ is supplied, the latch 622 incorporates and holds output data from the adder 621 as new phase information y. FIG. 12 shows an operation of the write request signal generation portion 620. As shown in FIG. 12, phase information y increases in units of Δy each time main clock φ is generated. When accumulation of frequency control information Δy results in an excess over upper bound M-1 for phase information y, the latch 622 stores the excess β as new phase information y. When phase information y overflows in this manner, the latch 622 will contain phase information y whose MSB falls from "1" to "0". This MSB's falling edge is supplied as a FIFO write request signal to the FIFO 4, the write pointer 601, and the linear interpolation coefficient generation circuit 7.

The linear interpolation coefficient generation circuit 7 in FIG. 9 holds value β in FIG. 12, i.e., phase information y output from the latch 622 at the time point when the FIFO write request signal is generated. The following equation is used to calculate linear interpolation coefficient α from this β.

$$\alpha = \beta / (M/L)$$

In this equation, M/L belongs to initial values M/L for frequency control information Δy stored in the addition value table 614 and corresponds to the second sampling frequency requested by the subsequent device.

The 1/L down-sampler 3 uses the thus obtained linear interpolation coefficient αto perform linear interpolation for audio data having the second sampling frequency between data A and B. Audio data resulting from this linear interpolation is written to the FIFO 4.

According to the above-mentioned sampling frequency converter, the frequency control portion 610 generates frequency control information Δy. The write request signal generation portion 620 accumulates frequency control information Δy in synchronization with main clock φ. A FIFO write request signal is generated each time phase information y as an accumulation result overflows. The 1/L down-sampler performs the linear interpolation of audio data. Audio data having the second sampling frequency is obtained as a result of the linear interpolation and is written to the FIFO 4. The frequency control portion 610 provides control to increase or decrease frequency control information Δy so as to align the effective data count in the FIFO 4 to an appropriate value. This necessitates generation of the FIFO write request signal having the same time density as an average time density for the FIFO read request signal in synchronization with main clock φ. Linear interpolation coefficient α used for the linear interpolation is calculated by using phase information y at the timing of generating the FIFO write request signal synchronized with the main clock φ. Even when a jitter occurs at the timing of generating data request signal LRCK and the FIFO read request signal, the embodiment can generate audio data having the second sampling frequency without being affected by the jitter and supply it to subsequent devices.

Figure 13:
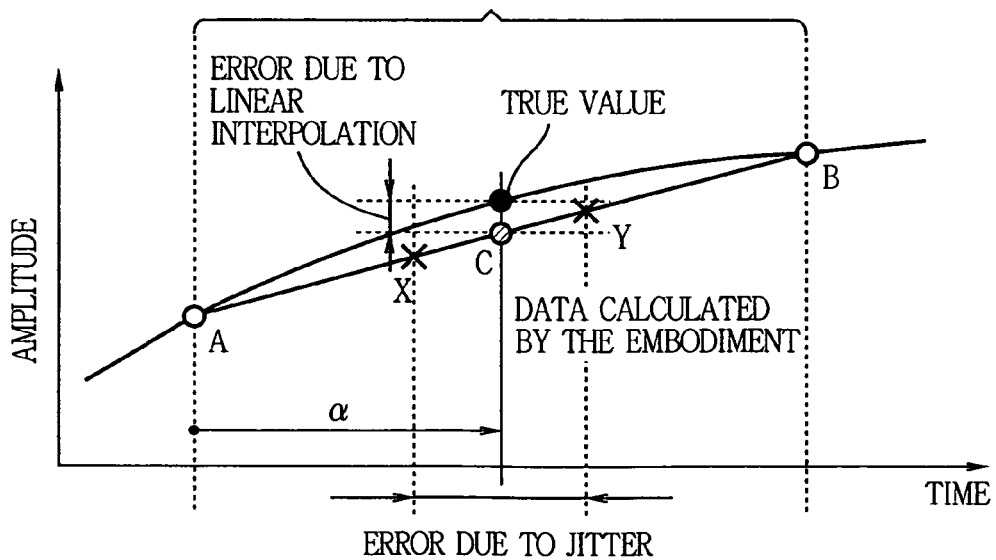
FIG. 13 is a diagram showing comparison between the effect of the embodiment and a conventional technology.

FIG. 13 shows comparison between the effect of the embodiment and a conventional technology. A conventional sampling frequency converter determines an interpolating point using the timing of receiving a data request signal from a subsequent device. The sampling frequency converter performs the linear interpolation using two audio data A and B before and after the interpolating point to find audio data at the interpolating point. Consequently, the interpolation causes audio data X or Y to be obtained depending on effects of a jitter at the timing of generating the data request signal. There has been a problem of distorting a waveform when the subsequent device reproduces audio data after the sampling frequency conversion. By contrast, the embodiment determines the interpolating point for audio data to be found by the linear interpolation based on phase information y at the timing of generating the FIFO write request signal synchronized with main clock φ. Accordingly, the position of this interpolating point is not affected by the jitter at the timing of generating the data request signal. According to the embodiment, the sampling frequency conversion may cause waveform distortion only due to a linear interpolation error, not a jitter. Therefore, it is possible to decrease waveform distortions compared to the conventional technology.

While there has been described the embodiment of the second aspect of the present invention, the present invention may be otherwise variously embodied. According to the above-mentioned embodiment, for example, the 8-times up-sampling is performed for input audio data having the first sampling frequency to generate 384 kHz audio data. Then, the 1/L-times down-sampling is performed to generate audio data having the second sampling frequency. Further, the 8-times up-sampling may be replaced by the 1/L-times down-sampling to perform a higher-level interpolation.

The invention claimed is:

1. A sampling frequency converter apparatus comprising:
an interpolation part that interpolates data according to an interpolation ratio; and
a transmission control part that transmits the interpolated data based on frequency control information,
wherein the interpolation part comprises:
a holding portion that successively receives data having a first sampling frequency and holds the received data as an interpolation input string of the data; and
an interpolating portion that generates the interpolated data having a second sampling frequency by performing interpolation using an interpolation coefficient corresponding to the interpolation ratio generated by the transmission control part and using the interpolation input string of the data held in the holding portion, and
wherein the transmission control part comprises:
a first-in first-out storage portion that is responsive to a write request signal for storing the interpolated data being outputted from the interpolation part and having the second sampling frequency, and that reads and outputs the stored data which has been stored earliest in response to a read request signal;
a remaining data amount detection portion that detects a remaining data amount of the data stored in the first-in first-out storage portion;
a variable frequency oscillating portion that generates an enable signal at a time rate according to the frequency control information so as to enable generation of the write request signal, and that generates the interpolation ratio varying at a speed according to the frequency control information; and
a frequency control portion that corrects the frequency control information so as to return the remaining data amount to an appropriate value when the remaining data amount detected by the remaining data amount detection portion varies away from the appropriate value toward an upper limit value or varies away from the appropriate value toward a lower limit value, or when the remaining data amount reaches the upper limit value or the lower limit value.

2. A sampling frequency converter apparatus comprising:
an interpolation part that interpolates data according to an interpolation coefficient; and
a transmission control part that transmits the interpolated data based on frequency control information,
wherein the interpolation part comprises:
a holding portion that successively receives data having a first sampling frequency and holds the received data as an interpolation input string of the data; and
an interpolating portion that generates the interpolated data having a second sampling frequency by performing interpolation using the interpolation coefficient generated by the transmission control part and using the interpolation input string of the data held in the holding portion, and
wherein the transmission control part comprises:
a first-in first-out storage portion that is responsive to a write request signal for storing the interpolated data being outputted from the interpolation part and having the second sampling frequency, and that reads and outputs the stored data which has been stored earliest in response to a read request signal;
a remaining data amount detection portion that detects a remaining data amount of the data stored in the first-in first-out storage portion;
a frequency control information generating portion that generates the frequency control information effective to control the remaining data amount to return to an appropriate value;
a write request signal generating portion that generates the write request signal at a timing obtained by accumulating the frequency control information; and
an interpolation coefficient generating portion that generates the interpolation coefficient at the timing when the write request signal is generated.

3. The sampling frequency converter apparatus according to claim 2, wherein the write request signal generating portion generates the write request signal which synchronizes with a main clock and which has the same time rate as an average time rate of the read request signal.

4. A sampling frequency converter apparatus comprising:
a first data storage portion that stores a specified number of data which are sequentially inputted;
a second data storage portion that stores newly inputted data in response to a write request signal and that sequentially reads the data which has been stored earliest in response to a read request signal;
a write speed adjusting portion that generates the write request signal which synchronizes with a main clock and which has the same time rate as an average time rate of the read request signal;
an interpolation coefficient generation portion that calculates an interpolation coefficient in correspondence to a timing of generating the write request signal; and
an interpolating portion that performs interpolation using the interpolation coefficient calculated by the interpolation coefficient generation portion at the timing of generating the write request signal and using the data stored in the first data storage portion and that supplies the data resulting from the interpolation to the second data storage portion.

5. The sampling frequency converter apparatus according to claim 4, wherein the write speed adjusting portion comprises:
an effective data count detection portion that detects an effective data count indicating a number of the stored data which remain in the second data storage portion;
a write request signal control portion that performs an operation synchronized with the main clock to generate phase information periodically varying at speeds corresponding to the frequency control information, and that generates the write request signal synchronized with a period of the phase information; and a frequency control portion that controls the frequency control information so as to converge the effective data count to an appropriate value, and wherein the interpolation coefficient generation portion calculates the interpolation coefficient from the phase information at a timing of generating the write request signal.

6. The sampling frequency converter apparatus according to claim 4, further comprising an N-times upsampler that multiplies a sampling frequency of input data by a factor of N (N is an integer greater than or equal to 2) and supplies the input data having the multiplied sampling frequency to the first data storage portion, wherein the interpolating portion performs linear interpolation of the input data stored in the first data storage portion.

* * * * *